United States Patent [19]

Elliott, Jr.

[11] Patent Number: 5,004,383

[45] Date of Patent: Apr. 2, 1991

[54] TUBE REAMING AND DEBURRING DEVICE

[75] Inventor: Albert O. Elliott, Jr., Duffield, Va.

[73] Assignees: Richard Huff; Amanda Huuf, both of Johnson City, Tenn.

[21] Appl. No.: 457,867

[22] Filed: Dec. 27, 1989

[51] Int. Cl.$^5$ .............................................. B23B 51/00
[52] U.S. Cl. ...................................... 408/211; 7/157; 408/199; 408/233
[58] Field of Search .................. 408/24, 25, 188, 199, 408/203.5, 211, 224, 227, 231, 233, 239 R, 228, 713; 7/157

[56] References Cited

U.S. PATENT DOCUMENTS

| 3,137,208 | 6/1964 | Andler | 408/211 |
| 3,365,773 | 1/1968 | Olsen | 408/224 |
| 3,802,793 | 4/1974 | Simon | 408/211 |

FOREIGN PATENT DOCUMENTS

| 2342815 | 9/1977 | France | 408/211 |
| 132173 | 9/1919 | United Kingdom | 408/203.5 |

Primary Examiner—Daniel W. Howell
Attorney, Agent, or Firm—Pitts and Brittian

[57] ABSTRACT

A tube reaming and deburring device (10) for deburring and beveling the edges of a tube end (12). The tube reaming and deburring device (10) comprises an inner edge cutting assembly (18) and an outer edge cutting assembly (20) mounted on opposite ends of a handle member (22). The inner edge cutting assembly (18) includes a first blade support member (24) having a forward portion (25) defining a conical surface (26). The inner edge cutting assembly also includes a plurality of replaceable blade members 30 mounted on the conical surface 26 for engaging the inner edge (14) of the tube end (12). The outer edge cutting assembly (20) includes a further blade support member (42) having a forward portion provided with a forwardly disposed tube receptor (46) defining a conical sidewall (48). The outer edge cutting assembly (20) also includes a plurality of replaceable blade members (50) mounted on the conical sidewall (48) for engaging the outer edge (16) of a tube end.

10 Claims, 2 Drawing Sheets

TUBE REAMING AND DEBURRING DEVICE

DESCRIPTION

1. Technical Field

This invention relates to devices for removing the burrs from, and/or beveling the inner and outer edges of tube or conduit ends. In this particular invention, the device includes inner and outer edge cutting assemblies mounted at opposite ends of a handle.

2. Background Art

When electrical metallic tubing (EMT conduit), PVC pipe, or various other tubing is cut, as by sawing, it is common for the newly cut tube end to have inner and outer edges which are jagged and sharp, and carry protruding burrs. These sharp, uneven edges can impair the effective use of the tube and can cause injury to those handling the tubing. For example, in the case of EMT conduit, burrs left on the edges of the conduit ends can cut into the insulation on the wiring which is run through the conduit and can cause couplings not to fit properly. Moreover, the metal burrs and sharp edges can cut and scratch the electrician who is installing the conduit. In view of this, attempts have been made to devise tools for removing the burrs from the edges of tube and conduit ends. Certain such devices are disclosed in U. S. Pat. Nos. 3,365,773; 3,763,510; 3,870,432; 3,976 388; and 4,678 380. However these devices tend to be either complex tools with various moving parts or simpler devices which sacrifice efficiency or which do not provide for easy, cost efficient blade replacement. In this regard, it will be appreciated by those skilled in the art that when used to cut the burrs from EMT conduit, blades can be dulled quickly and it is imperative that the device provide for quick and easy replacement of blades and that the blades be configured to be cost effectively replaced as needed.

Therefore, it is an object of the present invention to provide a tube reaming and deburring device for removing burrs and beveling the inner and outer edges of a tube or conduit end.

It is another object of the present invention to provide a tube reaming and deburring device having a plurality of blades which can quickly and easily be replaced.

Yet another object of the present invention is to provide a tube reaming and deburring device which is easy and cost efficient to use.

Still another object of the present invention is to provide a tube reaming and deburring device which is inexpensive to manufacture and maintain.

DISCLOSURE OF THE INVENTION

Other objects and advantages will be accomplished by the present invention which provides a tube reaming and deburring device for deburring and beveling the inner and outer edges of a tube end. The tube reaming and deburring device comprises an inner edge cutting assembly and an outer edge cutting assembly mounted on opposite ends of a handle member. The inner edge cutting assembly includes a first blade support member having a forward portion defining a conical surface and having a rearward portion for engaging the handle member. The inner edge cutting assembly also includes a plurality of replaceable blade members mounted on the conical surface, each blade member having at least one cutting edge for engaging the inner edge of the tube end. The outer edge cutting assembly includes a further blade support member having a forward portion provided with a forwardly disposed tube receptor defining a conical sidewall, and having a rearward portion for engaging the handle member. The outer edge cutting assembly also includes a plurality of replacement blade members mounted on the conical sidewall of the tube receptor, each blade member having at least one cutting edge for engaging the outer edge of the tube end.

BRIEF DESCRIPTION OF THE DRAWINGS

The above-mentioned features of the invention will become more clearly understood from the following detailed description of the invention read together with the drawings in which.

BEST MODE FOR CARRYING OUT THE INVENTION

Figure 1:
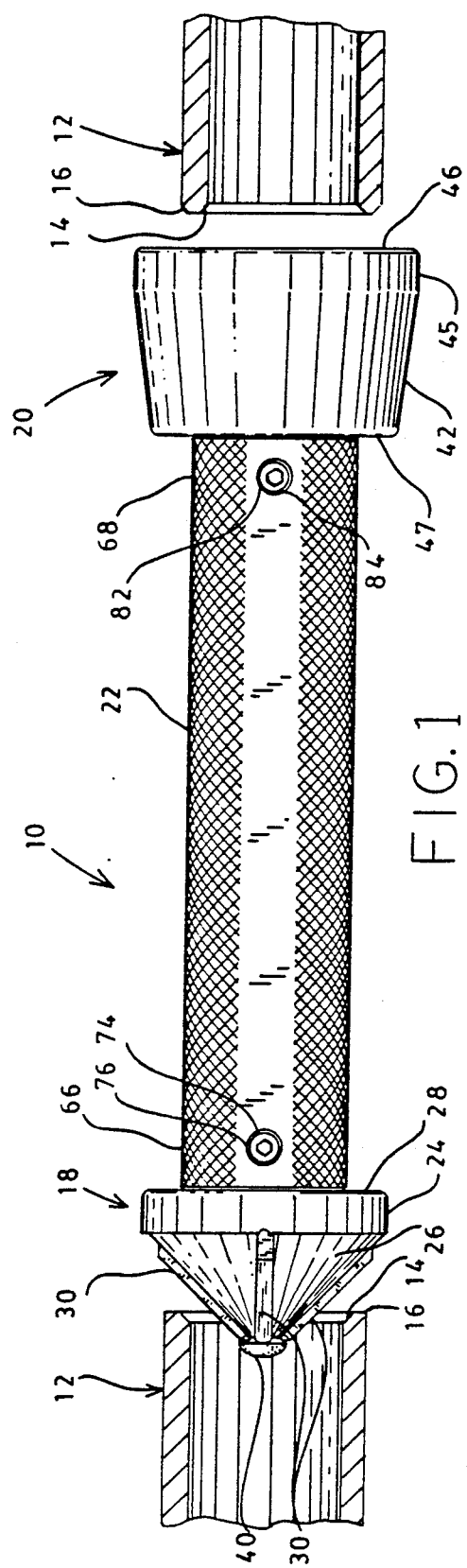
FIG. 1 illustrates a side elevation view of a tube reaming and deburring device of the present invention.

A tube reaming and deburring device incorporating various features of the present invention is illustrated generally at 10 in FIGS. 1-6. The device 10 is designed for removing burrs from, and/or for beveling the inner and outer edges 14 and 16, respectively, of a tube end 12. The tubing with which the device 10 is utilized can be fabricated of various materials. For example, the device 10 can be used to remove the burrs from, and/or to bevel the edges of, the ends of electrical metallic tubing (EMT conduit), copper tubing, PVC pipe, aluminum tubing, etc.

The tube reaming and deburring device 10 generally comprises inner and outer edge cutting assemblies 18 and 20, respectively, mounted at opposite ends of a handle member 22. The interior edge cutting assembly 18 includes a first blade support member 24 having a forward portion 25 defining a conical surface 26 and having a rearward portion 28. The assembly 18 also includes a plurality of elongated, independently replaceable blade members 30 mounted on, and protruding from, the conical surface 26, each such blade member 30 defining at least a first outer cutting edge 32, and preferably a second outer cutting edge 34, extending substantially the length of each blade member 30.

In the preferred embodiment, the releasable mounting of the blade members 30 is accomplished by providing mounting grooves 36 in the conical surface 26 for receiving the blade members 30. It will be noted that in this illustrated preferred embodiment, the grooves are radially aligned and substantially equally spaced about the conical surface 26 such that as the forward portion 25 is inserted into a tube end 12, the blade members 30, extending from the grooves 36, engage the inner edge 14 of the tube end 12 at substantially equally spaced points about the diameter of the inner edge 14. Accordingly, by rotating the device 10 axially in a first direction, the first cutting edges 32 serve to cutably engage the inner edge 14 and by rotating the device 10 in a second direction, the second cutting edges 34 cutably engage the inner edge. The equally spaced disposition of the blade members 30 about the conical surface 26 facilitates the substantially coaxial alignment of the device 10 with respect to the tube during use to produce a smooth, even beveling of the inner edge 14.

Figure 2:
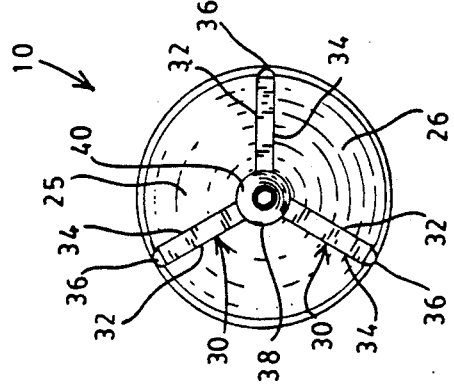
FIG. 2 illustrates an end view of a tube reaming and deburring device of the present invention.
Figure 5:
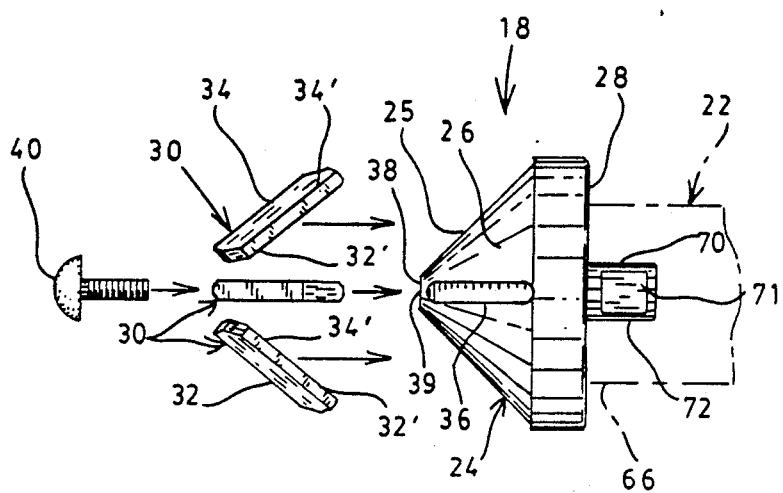
FIG. 5 illustrates an exploded side elevation view of the inner edge cutting assembly of a tube reaming and deburring device of the present invention.

In order to releasably hold the blade members 30 in position in the grooves 36, the forward portion 25 is provided with an outboard end 38 defining a coaxial threaded receptor 39 which is receptive of the screw 40. As illustrated in FIGS. 1 and 2, when threaded into the threaded receptor 39, the screw 40 engages the outboard edges of each blade member 30 as they converge proximate the vertex of the conical forward portion 25 so as to hold the blade members 30 in their respective grooves 36. Of course, by removing the screw 40, the blade members 30 can be removed for replacement or storage. It will also be noted that the blade members 30 can be provided with inner cutting edges 32' and 34' (see FIG. 5) such that when the outer cutting edges 32 and 34 become dull, the blade members 30 can be reversed in their grooves 36 such that the edges 32' and 34' are in position for use.

The exterior edge cutting assembly 20 includes a second blade support member 42 having a forward portion 44 defining a tube receptor 46 for receiving the tube end 12, the receptor 46 being provided with a conical sidewall 48. The assembly 20 also includes a plurality of elongated, independently replaceable blade members 50 mounted on, and protruding from, the conical sidewall 48, each such blade member 50 defining at least a first outer cutting edge 52 and preferably a second outer cutting edge 54, extending substantially the length of each blade member 50.

Figure 4:
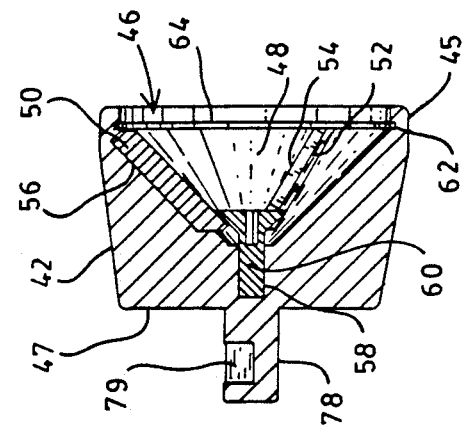
FIG. 4 illustrates a side elevation view, in section, of the outer edge cutting assembly of a tube reaming and deburring device of the present invention.
Figure 3:
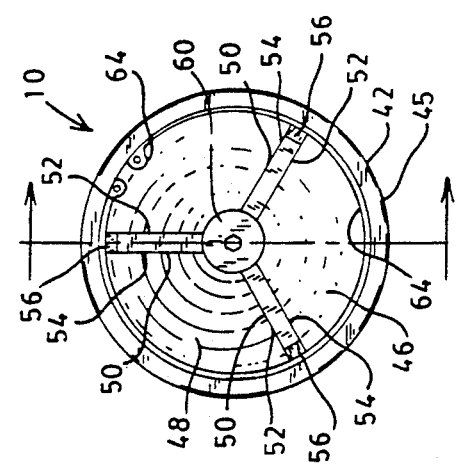
FIG. 3 illustrates an opposite end view of a tube reaming and deburring device of the present invention.
Figure 6:
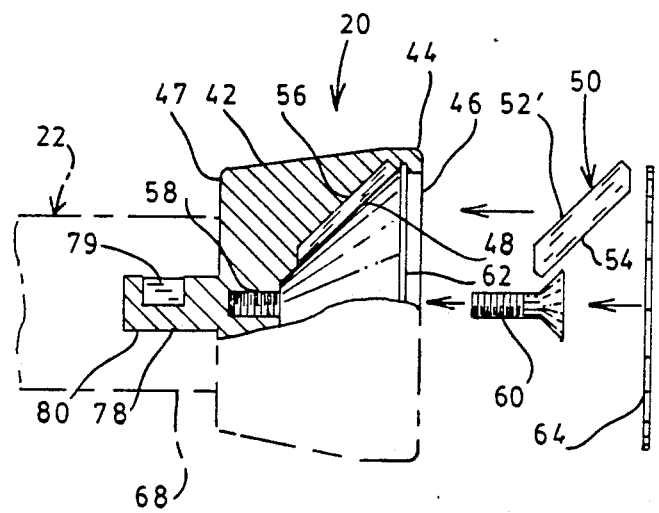
FIG. 6 illustrates a partial exploded side elevation view, partially in section, of the outer edge cutting assembly of a tube reaming and deburring device of the present invention.

In the preferred embodiment, the releasable mounting of the blade members 50 is accomplished by providing mounting grooves 56 in the conical sidewall 48 for receiving the blade members 50. As discussed above with respect to the grooves 36, the grooves 56 are preferably radially aligned and substantially equally spaced about the conical sidewall 48. In order to releasably hold the blade members 50 in position in the grooves 56, the tube receptor 46 is provided, in the preferred embodiment, with a coaxial threaded receptor 58 which is releasably receptive of the screw 60. As best illustrated in FIGS. 4 and 6, the head of the screw 60 serves to releasably hold the rearward ends of the blade members 50 in the grooves 56. Further, an annular recess 62, circumscribing the mouth of the receptor 46, is receptive of a snap ring 64 which releasably holds the forward ends of the blade members 50 in the grooves 56. It should also be noted that the blade members 50 can be provided with inner cutting edges 52' and 54' (see FIGS. 4 and 6) such that when the outer cutting edges 52 and 54 become dull, the blade members 50 can be reversed in their grooves 56 such that the edges 52' and 54' are in position for use. In this regard, it is contemplated that the blade members 30 and 50 define the same configuration so as to be interchangeably used with either assembly 18 or 20.

With respect to the mounting of the edge cutting assemblies 18 and 20 on the handle member 22, it will be noted that in the preferred embodiment the assembly 18 is mounted at the first end portion 66 of the handle member 22 and the assembly 20 is mounted at the second end portion 68 of the handle member 22. Preferably the assemblies 18 and 20 are releasably mounted on the handle member 22, but it will be understood that they can be permanently secured to the handle member if desired.

To accomplish the releasable securing of the inner edge cutting assembly to the handle member 22, the rearward portion 28 of the blade support member 24 is provided with a mounting stem 70 which is closely received in a socket 72 provided in the first end portion 66 of the handle member 22. A set screw 74 is threadably received in a hole 76 provided in the handle 22 and serves to engage the stem 70 as it is seated in the socket 72 so as to hold the blade support member 24 on the handle member 22. It will also be noted that the stem 70 can be provided with a recess 71 which receives the set screw 74 and thereby locks the stem 70 in place. Similarly, the outer edge cutting assembly 20 is releasably secured in place by providing the rearward portion 47 of the second blade support member 42 with a mounting stem 78 which is closely received in a socket 80 provided in the second end portion 68 of the handle 22. A further set screw 82 is threadably received in a hole 84 provided in the handle member 22 and serves to releasably engage the stem 78 as it is seated in the socket 80 so as to hold the second blade support member 42 on the handle member. As illustrated, the stem 78 can be provided with a recess 79 which receives the set screw 82 and thereby locks the stem 78 in place. However, notwithstanding the above, it will be recognized that various securing means can be used to releasably secure the assemblies 18 and 20 to the handle member 22.

With respect to the operation of the tube reaming and deburring device 10, it will be appreciated that the conical forward portion 25 of the first blade support member 24 is inserted into the tube end 12 to bring the blade members 30 into contact with the inner edge 14 of the tube end. The device 10 is then rotated axially in either direction to remove any burrs or sharp edges, leaving a smoothly beveled edge. In order to deburr the outer edge the tube end 12, the tube end is inserted into the tube receptor 46 to bring the blade members 50 into contact with the outer edge 16. The device 10 is then axially rotated in either direction to remove burrs from the outer edge 16 and to produce a smoothly beveled outer edge. Of course, should any of the blade members 30 or 50 be dulled through use, they can be reversed to utilize the inner cutting edges, or replaced with a new blade member 30 or 50.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A tube reaming and deburring device for reaming and deburring the end of a tube, said tube end defining inner and outer edges, said device comprising:

a handle member;

an inner edge cutting assembly for being supported on said handle including a first blade support member having a forward portion defining a conical surface and a rearward portion, and including a plurality of elongated, replaceable blade members mounted on said conical surface, each said blade member having at least one cutting edge for engaging said inner edge of said tube end; and an outer edge cutting assembly for being supported by said handle including a further blade support member having a forward portion provided with a forwardly disposed tube receptor defining a conical sidewall and having a rearward portion, said outer edge cutting assembly also including a plurality of elongated, replaceable further blade members mounted on said conical sidewall, each said further blade member defining first and second end portions and having at least one cutting edge for engaging said outer edge of said tube end, said further blade support member being provided with a plurality of further blade mounting grooves radially disposed in said conical sidewall for releasably receiving said further blade members, said further blade support member being provided with a second coaxial threaded receptor within said tube receptor for receiving a second screw, said second screw having a head portion for engaging said second end portions of said further blade members as said second screw is seated in said second coaxial receptor thereby releasably holding said further blade members in said grooves.

2. The tube reaming and deburring device of claim 1 wherein said tube receptor defines an annular recess, and wherein said outer edge cutting assembly includes a snap ring for being releasably received in said annular recess and engaging said first end portions of said further blade members whereby said snap ring releasably secures said first end portions of said further blade members in said further blade mounting grooves.

3. The tube reaming and deburring device of claim 2 wherein said first blade support member is provided with a plurality of blade mounting grooves radially disposed in said conical surface for releasably receiving said blade members.

4. The tube reaming and deburring device of claim 3 wherein each said blade member defines first and second end portions and wherein said forward portion of said first blade support member is provided with a first coaxial threaded receptor for receiving a first screw, said first screw having a head portion for engaging said first end portions of said blade members as said screw is seated in said threaded recess thereby releasably holding said blade members in said grooves.

5. A tube reaming and deburring device for reaming and deburring the end of a tube, said tube end defining inner and outer edges, said device comprising:

a handle member;

an inner edge cutting assembly for being supported on said handle including a first blade support member having a forward portion defining a conical surface and a rearward portion, and including a plurality of elongated, replaceable blade members mounted on said conical surface, each said blade member defining first and second end portions and having at least one cutting edge for engaging said inner edge of said tube end, said first blade support member being provided with a plurality of blade mounting grooves radially disposed in said conical surface for releasably receiving said blade members, said forward portion of said first blade support member being provided with a first coaxial threaded receptor for receiving a first screw, said first screw having a head portion for engaging said first end portions of said blade members as said screw is seated in said threaded recess thereby releasably holding said blade members in said grooves; and an outer edge cutting assembly for being supported by said handle including a further blade support member having a forward portion provided with a forwardly disposed tube receptor defining a conical sidewall and having a rearward portion, said outer edge cutting assembly also including a plurality of elongated, replaceable further blade members mounted on said conical sidewall, each said further blade member having at least one cutting edge for engaging said outer edge of said tube end.

6. The tube reaming and deburring device of claim 5 wherein said further blade support member is provided with a plurality of further blade mounting grooves radially disposed in said conical sidewall for releasably receiving said further blade members.

7. The tube reaming and deburring device of claim 6 wherein each said further blade member defines first and second end portions and wherein said further blade support member is provided with a second coaxial threaded receptor within said tube receptor for receiving a second screw, said second screw having a head portion for engaging said second end portions of said further blade members as said second screw is seated in said second coaxial receptor thereby releasably holding said further blade members in said grooves.

8. A tube reaming and deburring device for reaming and deburring the end of a tube, said tube end defining inner and outer edges said device comprising:

a handle member;

an inner edge cutting assembly for being supported by said handle member, said inner edge cutting assembly including a first blade support member having a forward portion defining a conical surface and having a rearward portion, said first blade support member being provided with a plurality of blade mounting grooves radially disposed in said conical surface for releasably receiving a plurality of blade members, each said blade member having a first and second end portion, said forward portion of said first blade support member being further provided with a first coaxial threaded receptor and a first screw for being threaded therein, said first screw having a head portion for engaging said first end portions of said blade members as said first screw is seated in said first threaded receptor so as to releasably hold said blade members in said grooves; and an outer edge cutting assembly for being supported by said handle, including a further blade support member having a forward portion provided with a forwardly disposed tube receptor defining a conical sidewall and having a rearward portion, said further blade support member being provided with a plurality of further blade mounting grooves radially disposed in said conical sidewall for releasably receiving a plurality of further blade members, each said further blade member having first and second end portions, said further blade support member being provided with a second coaxial threaded receptor within said tube receptor for receiving a second screw, said second screw having a head portion for engaging said second end portions of said further blade members as said second screw is seated in said second coaxial receptor to hold said further blade members in said further grooves, said tube receptor also defining an annular recess for releasably receiving a snap ring, whereby said snap ring releasably engages said first end portions of said further blade members so as to releasably hold said further blade members in said further grooves.

10. A tube reaming and deburring device for reaming and deburring the end of a tube, said tube end defining inner and outer edges, said device comprising:
 a handle member; and
 an inner edge cutting assembly for being supported on said handle including a first blade support member having a forward portion defining a conical surface and a rearward portion, and including a plurality of elongated, replaceable blade members mounted on said conical surface, each said blade member defining first and second end portions and having at least one cutting edge for engaging said inner edge of said tube end, said first blade support member being provided with a plurality of blade mounting grooves radially disposed in said conical surface for releasably receiving said blade members, said forward portion of said first blade support member being provided with a first coaxial threaded receptor for receiving a screw, said screw having a head portion for engaging said first end portions of said blade members as said screw is seated in said threaded recess thereby releasably holding said blade members in said grooves.

10. A tube reaming and deburring device for reaming and deburring the end of a tube, said tube end defining inner and outer edges, said device comprising:
 a handle member; and
 an outer edge cutting assembly for being supported by said handle including a blade support member having a forward portion provided with a forwardly disposed tube receptor defining a conical sidewall and having a rearward portion, said outer edge cutting assembly also including a plurality of elongated, replaceable blade members mounted on said conical sidewall, each said blade member defining first and second end portions and having at least one cutting edge for engaging said outer edge of said tube end, said blade support member being provided with a plurality of blade mounting grooves radially disposed in said conical sidewall for releasably receiving said blade members, said blade support member being provided with a coaxial threaded receptor within said tube receptor for receiving a screw, said screw having a head portion for engaging said second end portions of said blade members as said screw is seated in said coaxial receptor thereby releasably holding said blade members in said grooves.

* * * * *